(12) United States Patent
Andersson et al.

(10) Patent No.: US 11,240,497 B2
(45) Date of Patent: Feb. 1, 2022

(54) DEBLOCKING IN A VIDEO ENCODER AND/OR VIDEO DECODER

(71) Applicant: Telefonaktiebolaget LM Ericsson (publ), Stockholm (SE)

(72) Inventors: Kenneth Andersson, Gävle (SE); Jack Enhorn, Kista (SE); Ruoyang Yu, Täby (SE); Zhi Zhang, Solna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 61 days.

(21) Appl. No.: 16/630,233

(22) PCT Filed: Nov. 12, 2019

(86) PCT No.: PCT/SE2019/051144
§ 371 (c)(1),
(2) Date: Jan. 10, 2020

(87) PCT Pub. No.: WO2020/101559
PCT Pub. Date: May 22, 2020

(65) Prior Publication Data
US 2021/0218961 A1  Jul. 15, 2021

Related U.S. Application Data

(60) Provisional application No. 62/767,758, filed on Nov. 15, 2018.

(51) Int. Cl.
*H04N 7/18* (2006.01)
*H04N 19/117* (2014.01)
(Continued)

(52) U.S. Cl.
CPC ......... *H04N 19/117* (2014.11); *H04N 19/105* (2014.11); *H04N 19/132* (2014.11);
(Continued)

(58) Field of Classification Search
CPC .... H04N 19/117; H04N 19/82; H04N 19/105; H04N 19/159; H04N 19/176; H04N 19/132
(Continued)

(56) References Cited

U.S. PATENT DOCUMENTS 8,798,131 B1     8/2014  Bankoski et al.
2011/0255600 A1*  10/2011  Lin .................. H04N 19/52
                                                    375/240.16
(Continued)

FOREIGN PATENT DOCUMENTS

WO       2008/004940 A1    1/2008

OTHER PUBLICATIONS

International Search Report and Written Opinion dated Feb. 13, 2020 issued in International Application No. PCT/SE2019/051144, (14 pages).

(Continued)

*Primary Examiner* — Shan E Elahi
(74) *Attorney, Agent, or Firm* — Rothwell, Figg, Ernst & Manbeck, P.C.

(57) ABSTRACT

A deblocking method for deblocking a boundary between a first block of samples, block P, and a second block of samples, block Q. The method includes determining whether at least one of the P block or the Q block is a combined intra-inter prediction block; and, as a result of determining that at least one of the P block or the Q block is a combined intra-inter prediction block, deblocking the boundary between the P block and the Q block.

16 Claims, 13 Drawing Sheets

(51) Int. Cl.
*H04N 19/105* (2014.01)
*H04N 19/132* (2014.01)
*H04N 19/159* (2014.01)
*H04N 19/176* (2014.01)
*H04N 19/82* (2014.01)

(52) U.S. Cl.
CPC ......... *H04N 19/159* (2014.11); *H04N 19/176* (2014.11); *H04N 19/82* (2014.11)

(58) Field of Classification Search
USPC ..................................................... 375/240.02
See application file for complete search history.

(56) References Cited

U.S. PATENT DOCUMENTS

| | | | |
|---|---|---|---|
| 2012/0287994 A1* | 11/2012 | Van der Auwera | H04N 19/176 375/240.12 |
| 2014/0072041 A1* | 3/2014 | Seregin | H04N 19/503 375/240.13 |
| 2015/0016550 A1* | 1/2015 | Kim | H04N 19/117 375/240.29 |
| 2015/0264386 A1* | 9/2015 | Pang | H04N 19/52 375/240.16 |
| 2018/0255299 A1* | 9/2018 | Lee | H04N 19/122 |
| 2019/0238890 A1* | 8/2019 | Tsai | H04N 19/137 |
| 2020/0177916 A1* | 6/2020 | Niamut | A01C 3/023 |
| 2021/0029352 A1* | 1/2021 | Zhang | H04N 19/11 |
| 2021/0152827 A1* | 5/2021 | Park | H04N 19/82 |
| 2021/0211665 A1* | 7/2021 | Gao | H04N 19/176 |

OTHER PUBLICATIONS

Bross, B. et al., "Versatile Video Coding (Draft 5)", Joint Video Experts Team (JVET) of ITU-T SG 16 WP 3 and ISO/IEC JTC 1/SC 29/WG 11; 14th Meeting; Geneva, CH, Mar. 19-27, 2019; Document: JVET-N1001-v10. (406 pages).

Bross, B. et al., "Versatile Video Coding (Draft 3)", Joint Video Experts Team (JVET) of ITU-T SG 16 WP 3 and ISO/IEC JTC 1/SC 29/WG 11; 12th Meeting: Macao, CN, Oct. 13-12, 2018; Document: JVET-L1001-v2. (168 pages).

Chiang, M. et al., "CE10.1.1: Multi-hypothesis prediction for improving AMVP mode, skip or merge mode, and intra mode", Joint Video Experts Team (JVET) of ITU-T SG 16 WP 3 and ISO/IEC JTC 1/SC 29/WG 11; 12th Meeting Macao, CN, Oct. 13-12, 2018; Document: JVET-L0100-v3. (14 pages).

Bross, B. et al., "Versatile Video Coding (Draft 3)", Joint Video Experts Team (JVET) of ITU-T SG 16 WP 3 and ISO/IEC JTC 1/SC 29/WG 11; 12th Meeting: Macao, CN, Oct. 3-12, 2018; Document: JVET-L1001-v9. (233 pages).

* cited by examiner

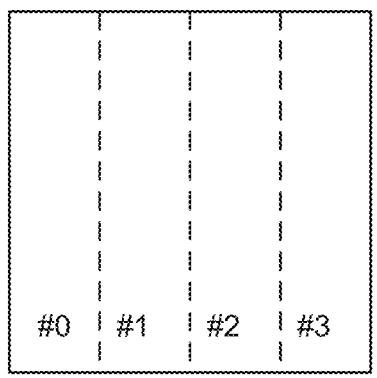
FIG. 1A
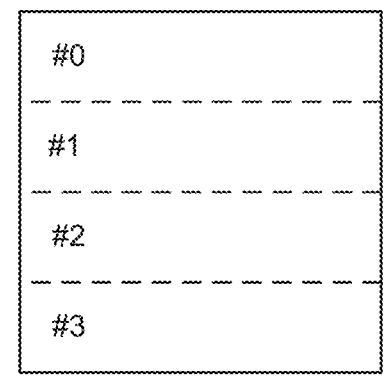
FIG. 1B
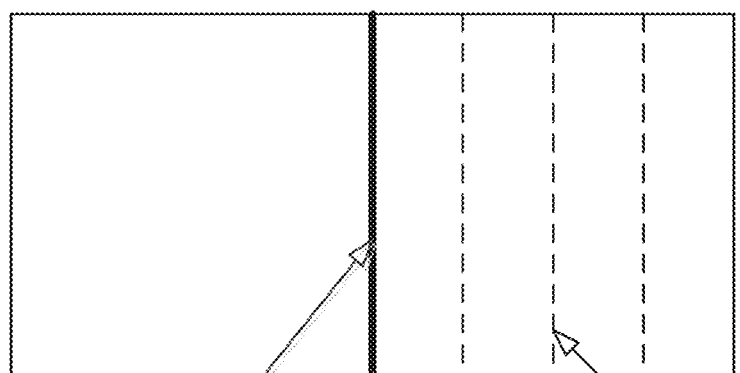
CU boundary    FIG. 1C
Boundary from combined intra-inter prediction
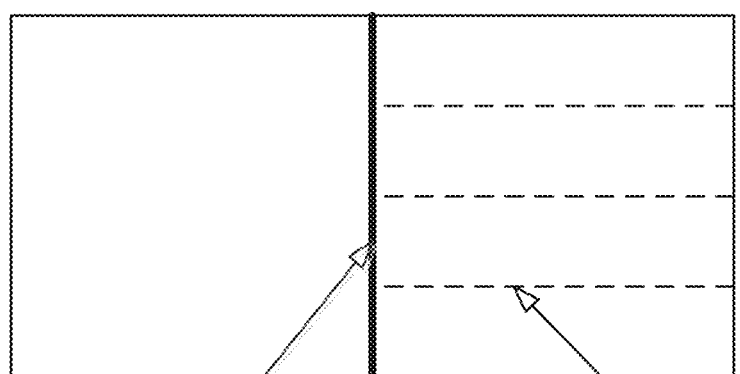
CU boundary    FIG. 1D
Boundary from combined intra-inter prediction

DEBLOCKING IN A VIDEO ENCODER AND/OR VIDEO DECODER

CROSS REFERENCE TO RELATED APPLICATION(S)

This application is a 35 U.S.C. § 371 National Stage of International Patent Application No. PCT/SE2019/051144, filed Nov. 12, 2019, designating the United States and claiming priority to U.S. provisional application No. 62/767, 758, filed on Nov. 15, 2018. The above identified applications are incorporated by reference.

TECHNICAL FIELD

This disclosure relates to video encoding and/or decoding.

BACKGROUND

This disclosure relates to the encoding and/or decoding of a video sequence, which consists of a series of images (a.k.a., pictures). Each image of the video sequence consists of one or more components. Each component can be described as a two-dimensional rectangular array of sample values. It is common that an image in a video sequence consists of three components: one luma component (Y) where the sample values are luma values, a first chroma component (Cb) where the sample values are chroma values and a second chroma component (Cr) where the sample values are chroma values. Other examples include Y' Cb Cr, Yuv and $IC_TC_P$. In $IC_TC_P$, I is the "intensity luma" component. For the remainder of this document we will refer to any luma component Y', Y or I as Y or simply luma. It is common that the dimensions of the chroma components are smaller than the luma components by a factor of two in each dimension. For example, the size of the luma component of an HD image would be 1920×1080 and the chroma components would each have the dimension of 960×540. Components are sometimes referred to as color components.

A block is a two-dimensional array of samples. In video coding, each component is split into blocks and the coded video bitstream is a series of blocks. It is common in video coding that the image is split into units that cover a specific area of the image. Each unit consist of all blocks from all components that make up that specific area and each block belongs fully to one unit. The macroblock in H.264 and the Coding unit (CU) in HEVC are examples of units.

In HEVC, each picture is partitioned into coding tree units (CTU). A CTU consist of an N×N block of luma samples and two M×M corresponding chroma blocks. A CTU in HEVC is like a macroblock in H.264 and earlier standards but in contrast to macroblocks the CTU size is configurable. Most often, however, the CTU size in HEVC is set to 64×64 luma samples. Each CTU can be recursively quadtree split. The root of the quadtree is then associated with the CTU. The quadtree is split until a leaf is reached, which is referred to as the coding unit (CU). A CU in HEVC always consist of a luma block with equal height and width. How each CTU is split is conveyed in the bitstream. The CU is further the root node of two other trees, the prediction tree that has got prediction units (PUs) as nodes and the transform tree that has got transform units (TUs) as nodes. Some decoding processes in HEVC are done on the CU level, some are done on the PU level and some on TU level. Boundaries between PUs and boundaries between TUs are deblocked—i.e., filtered by a deblocking filter, to reduce discontinuities between TUs and PUs. In HEVC there exist two kinds of prediction types for a PU, intra-prediction which only uses prediction from previously decoded samples of the current picture for prediction, and inter-prediction which uses prediction form at least one previously decoded picture.

In HEVC, deblocking is first applied on vertical boundaries and then on horizontal boundaries. The boundaries are either TU boundaries or PU boundaries. To enable parallel friendly deblocking, the deblocking is performed on an 8×8 sample grid.

A deblocking filter strength parameter (BS) is set for each boundary. If the value of BS is larger than 0, then deblocking may be applied. The larger the boundary strength is, the stronger filtering is applied. First it is checked if any of the blocks at a PU boundary between the blocks is an intra-predicted block then (BS is set to=2), or if both blocks use inter-prediction but and they use different reference frames or have significantly different motion vectors then (BS is set to=1). It is also checked if a TU boundary between the blocks has non-zero transform coefficients in at least one of the blocks (code block flag CBF equal to 1), then (BS is set to=1). This first checks sets a boundary strength (BS) which is larger than 0 to indicate that deblocking should be applied. The larger the boundary strength, the stronger filtering is applied. To reduce/avoid removing natural structures when deblocking, a check that there are not any natural structures on respective sides of the boundary is then applied for luma. In HEVC, gradient calculations are used on respective sides of the boundary using the following inequality: abs(p0−2*p1+p2)+abs(q0−2*q1+q2)<beta, where beta is a parameter based on the quantization parameter for the block and p0, p1, to p2 are samples on one side of the block boundary and q0, q1, to q2 are samples on the other side of the block boundary. The condition is checked at two positions along the boundary, and if both conditions are fulfilled, then the luma samples are deblocked for that 4 sample part of the boundary. Chroma boundaries may always be filtered if one any of the neighbouring blocks are intra coded.

In the current draft of the specification for H.266 (VVC draft 3 JVET-L1001 (see reference [1]) (hereafter "VVC" for short)) a coding tree unit (CTU) is similar to the CTU in HEVC with the difference that the CTU in H.266 has a size of 128×128 luma samples. In VVC, the CTU can be split more flexibly such that a resulting CUs may consist of a rectangular luma block. In VVC, there is no prediction tree as in HEVC. However, a CU in VVC can implicitly be divided into a multiple of TUs. Implicit TUs can however only appear when the CU size has a width or height larger than the maximum transform size. If that is not the case, the CU does not have any prediction tree nor transform tree.

In VVC, deblocking is first applied on vertical CU boundaries and vertical implicit TU boundaries and vertical sub-block boundaries then on horizontal CU boundaries and horizontal implicit TU boundaries and horizontal sub-block boundaries. The deblocking is based on HEVC deblocking.

In VVC two sub-block prediction tools are included AFFINE and ATMVP. A sub-block prediction tool can be characterized as a prediction tool that has more than one set of motion parameters for different parts of a block, e.g. sub-blocks. AFFINE operates on sub-block size 4×4 and ATMVP on sub-block size 8×8. Each sub-block is predicted by specific motion parameters such as at least one motion vector and one indicator of reference frame to predict from. When a CU uses sub-block motion compensation like ATMVP and AFFINE, sub-block boundaries can be created inside CU due to different motion parameters are used in at least some of the sub-blocks. In VVC (JVET-L1001) from Macau, in addition to deblock CU and implicit TU boundaries on 8×8 grid also sub-block boundaries are deblocked on 8×8 grid when motion parameters on respective side of a sub-block boundary differs sufficiently. Both CU, implicit TU and sub-block boundaries can be deblocked in parallel since deblocking is based on HEVC luma deblocking that reads at most 4 samples and writes at most 3 samples, on each side of the boundary, which is sufficient for when deblocking on an 8×8 grid.

In VVC a tool that combines intra-predication and inter-prediction has been adopted (originates from JVET-L0100 test CE10.1.1.c). When the combination is used for vertical or horizontal intra-prediction the prediction block is formed by a weighted addition of the intra-prediction and the inter-prediction where 4 weighting factors (w={6/8, 5/8, 3/8, 2/8} for intra and 1-w for inter) are used. Each weighting factor is used for ¼ of the width for horizontal prediction and ¼ of the height for vertical intra-prediction.

FIG. 1A shows an example when the intra-prediction is horizontal prediction. The block is sub-partitioned into 4 sub-blocks: #0, #1, #2 and #3. The weight {w_intra, w_inter} for each part is {6/8, 2/8}, {5/8, 3/8}, {3/8, 5/8} and {2/8, 6/8}. Since each sub-block uses different weights to combine intra-inter prediction, one can say that the magnitude modification for each-sub-blocks are different.

FIG. 1B shows another example when the intra-prediction is vertical prediction. The block is sub-partitioned into 4 sub-blocks where each sub-block has its height equals to ¼ of the height of the original block. Similarly, each sub-block uses different weights to combine intra-inter prediction.

Using different weights to combine intra-inter prediction generates sub-block boundaries. FIG. 1C below shows an example of vertical boundaries from combined intra-inter prediction using horizontal intra prediction.

The direction of cu boundary could be different to the sub-block boundaries, for example, when the sub-block boundaries are horizontal, the cu boundary is vertical. FIG. 1D shows an example of horizontal boundaries from combined intra-inter prediction using vertical intra prediction.

The cu boundary could exist when using equal weights to combine intra and inter prediction. When the combined intra prediction is planar or dc prediction, the combine weights for intra and inter are equal.

SUMMARY

Certain challenges currently exist. For example, no deblocking of boundaries between combined intra-inter prediction and other CUs in case motion parameters are identical and no CU is intra, and no deblocking of internal boundaries originating from sub-blocks of the combined intra-inter prediction block that are weighted differently. Accordingly, this disclosure describes embodiments for overcoming these and/or other challenges.

Example 1

Prediction Block Boundary

In one embodiment, a boundary between a first block (denoted block P) and a second block (denoted block Q) is deblocked, where at least block P or block Q is based on a weighted combination of an intra-prediction block and an inter-prediction block. In one embodiment, the inter-prediction block is a block predicted from reconstructed samples of the current picture, e.g. intra block copy also referred to as current picture referencing.

Example 2

Internal Prediction Block Boundary

In another embodiment, a sub-block boundary inside a block is deblocked, where the block is based on a prediction block that was created using one magnitude modification on one side of the sub-block boundary and another magnitude modification on the other side of the sub-block boundary. Example of magnitude modification is by scaling a sub-block by a weighting factor or an additive offset such that the magnitude of the samples of the sub-block is changed.

Accordingly, in on aspect there is a method for deblocking a boundary between a first block of samples, block P, and a second block of samples, block Q. The method includes determining whether at least one of the P block or the Q block is a combined intra-inter prediction block. The method also includes, as a result of determining that at least one of the P block or the Q block is a combined intra-inter prediction block, deblocking (804) the boundary between the P block and the Q block.

In some embodiments, the step of deblocking the boundary between the P block and the Q block comprises reducing a discontinuity between the P block and the Q block. In some embodiments, reducing the discontinuity between P and Q comprises filtering the P block using a deblocking filter and filtering the Q block using the deblocking filter.

In some embodiments the process also includes setting a boundary strength, bs, variable for the boundary to a value that is greater than zero as a result of determining that at least one of the P block or the Q block is a combined intra-inter prediction block.

In some embodiments the boundary is a vertical boundary or a horizontal boundary.

In some embodiments, the process also includes generating a block of samples based on a weighted combination of an intra-prediction block and an inter-prediction block, wherein one of the P block or the Q block is the generated block of samples. In some embodiments, the process also includes generating the intra-prediction block from a line of samples or generating the intra-prediction block from referencing a block in a current picture. In some embodiments, the process also includes generating the inter-prediction block from referencing at least one block in a previous decoded picture or generating the inter-prediction block from referencing a block in a current picture.

In some embodiments, the process also includes deblocking a boundary between a first sub-block and a second sub-block if a first condition is true, wherein the first condition is true if: the first sub-block is a weighted combination of a first intra prediction sub-block and a first inter prediction sub-block, the second sub-block is a weighted combination of a second intra prediction sub-block and a second inter prediction sub-block, and the weight for the first intra prediction sub-block is different from the weight for the second intra prediction sub-block.

An advantage of the embodiments is that they enable deblocking with reduction in blocking artifacts originating from combined intra-inter prediction.

BRIEF DESCRIPTION OF THE DRAWINGS

The accompanying drawings, which are incorporated herein and form part of the specification, illustrate various embodiments.

FIG. 1A shows an example when the intra-prediction is horizontal prediction.

FIG. 1B shows an example when the intra-prediction is vertical prediction.

FIG. 1C shows an example of vertical boundaries from combined intra-inter prediction using horizontal intra prediction.

FIG. 1D shows an example of horizontal boundaries from combined intra-inter prediction using vertical intra prediction.

DETAILED DESCRIPTION

Figure 2:
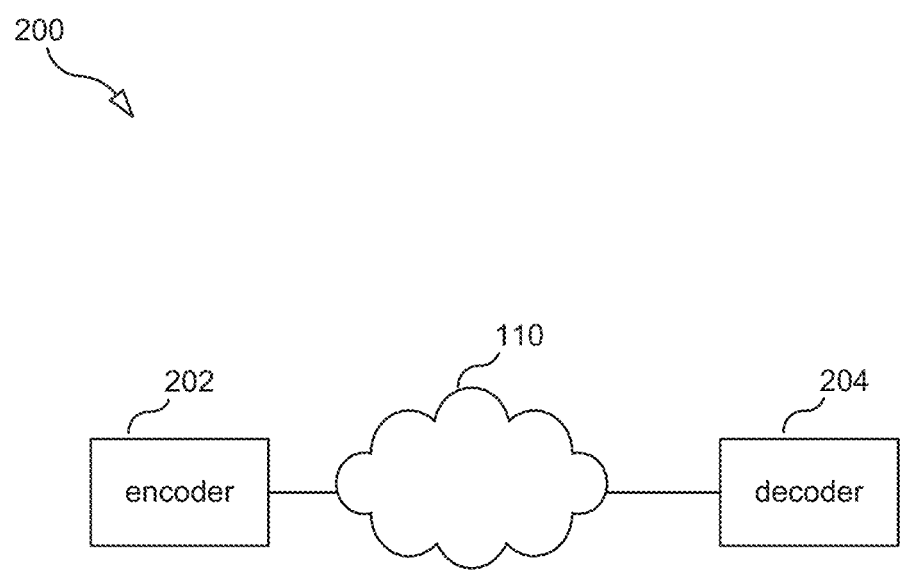
FIG. 2 illustrates a system comprising an encoder and a decoder.

FIG. 2 illustrates a system 200 according to an example embodiment. System 200 includes an encoder 202 in communication with a decoder 204 via a network 110 (e.g., the Internet or other network). Deblocking may be performed in both encoder 202 and decoder 204.

Figure 3:
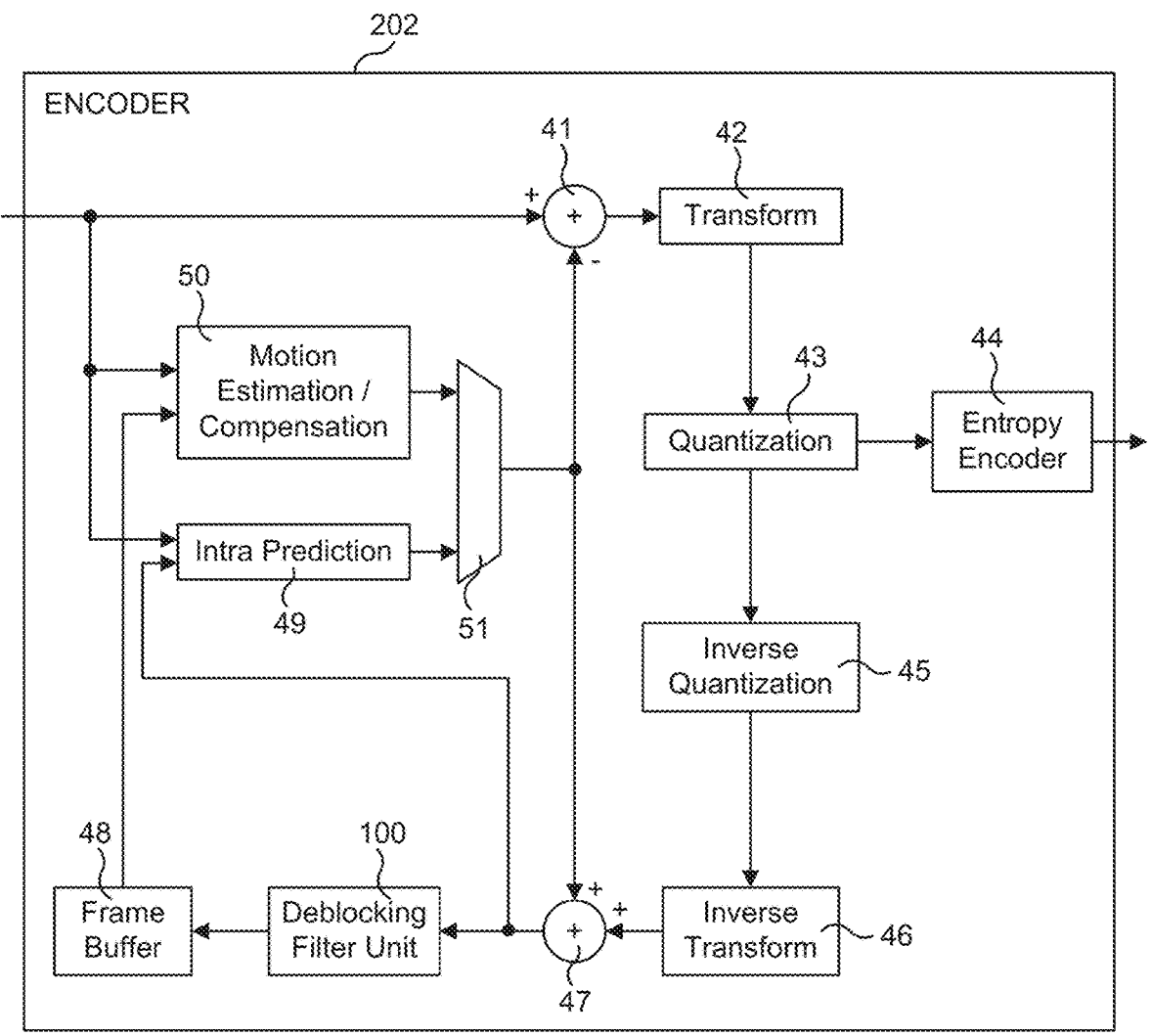
FIG. 3 illustrates an example encoder.

FIG. 3 is a schematic block diagram of encoder 202 for encoding a block of pixels in a video frame of a video sequence according to an embodiment. A current block of pixels is predicted by performing a motion estimation by a motion estimator 50 from an already provided block of pixels in the same frame or in a previous frame. The result of the motion estimation is a motion or displacement vector associated with the reference block, in the case of inter-prediction. The motion vector is utilized by a motion compensator 50 for outputting an inter-prediction of the block of pixels. An intra-predictor 49 computes an intra-prediction of the current block of pixels. The outputs from the motion estimator/compensator 50 and the intra-predictor 49 are input in a selector 51 that either selects intra-prediction or inter-prediction or a weighted combination of intra and inter prediction for the current block of pixels. The output from the selector 51 is input to an error calculator in the form of an adder 41 that also receives the pixel values of the current block of pixels. The adder 41 calculates and outputs a residual error as the difference in pixel values between the block of pixels and its prediction. The error is transformed in a transformer 42, such as by a discrete cosine transform, and quantized by a quantizer 43 followed by coding in an encoder 44, such as by entropy encoder. In inter coding, also the estimated motion vector is brought to the encoder 44 for generating the coded representation of the current block of pixels. The transformed and quantized residual error for the current block of pixels is also provided to an inverse quantizer 45 and inverse transformer 46 to retrieve the original residual error. This error is added by an adder 47 to the block prediction output from the motion compensator 50 or the intra-predictor 49 or a weighted combination of intra and inter prediction to create a reference block of pixels that can be used in the prediction and coding of a next block of pixels. This new reference block is first processed by a deblocking filter unit 100 according to the embodiments in order to perform deblocking filtering to combat any blocking artifact. The processed new reference block is then temporarily stored in a frame buffer 48, where it is available to the intra-predictor 49 and the motion estimator/compensator 50.

Figure 4:
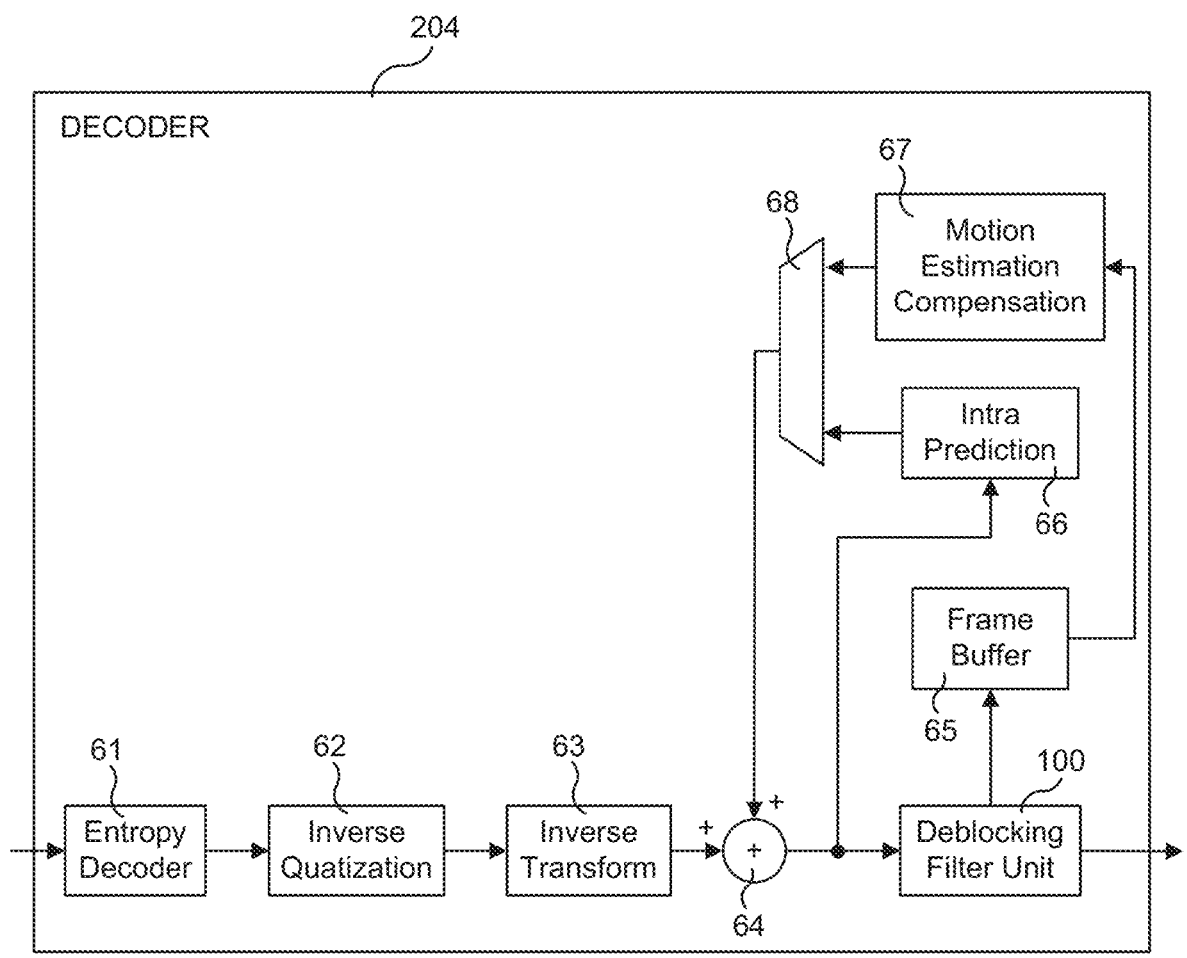
FIG. 4 illustrates an example decoder.

FIG. 4 is a corresponding schematic block diagram of decoder 204 according to some embodiments. The decoder 204 comprises a decoder 61, such as entropy decoder, for decoding an encoded representation of a block of pixels to get a set of quantized and transformed residual errors. These residual errors are dequantized in an inverse quantizer 62 and inverse transformed by an inverse transformer 63 to get a set of residual errors. These residual errors are added in an adder 64 to the pixel values of a reference block of pixels. The reference block is determined by a motion estimator/compensator 67 or intra-predictor 66 or both, depending on whether inter or intra-prediction or weighted combination of intra and inter prediction is performed. A selector 68 is thereby interconnected to the adder 64 and the motion estimator/compensator 67 and the intra-predictor 66. The resulting decoded block of pixels output form the adder 64 is input to a deblocking filter unit 100 according to the embodiments in order to deblocking filter any blocking artifacts. The filtered block of pixels is output form the decoder 204 and is furthermore preferably temporarily provided to a frame buffer 65 and can be used as a reference block of pixels for a subsequent block of pixels to be decoded. The frame buffer 65 is thereby connected to the motion estimator/compensator 67 to make the stored blocks of pixels available to the motion estimator/compensator 67. The output from the adder 64 is preferably also input to the intra-predictor 66 to be used as an unfiltered reference block of pixels.

Figure 5:
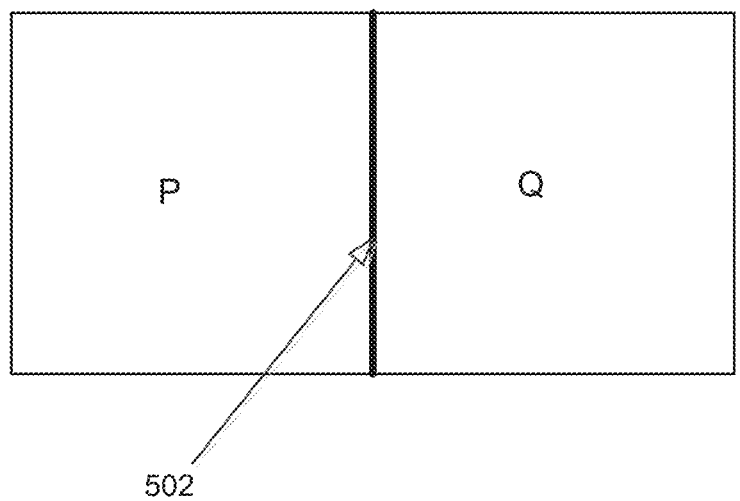
FIG. 5 illustrates a vertical boundary between two blocks.

Deblocking is performed at both the encoder 202 and the decoder 204. This disclosure describes deblocking of vertical boundaries between a first block (denoted block P) and a second block (denoted block Q) (see FIG. 5), where the block P is on the left side of the vertical boundary 502 and the block Q is on the right side of the vertical boundary 502, but the same can apply to horizontal boundaries where the block P is above the horizontal boundary and the block Q is below the horizontal boundary.

Example 1

Figure 6:
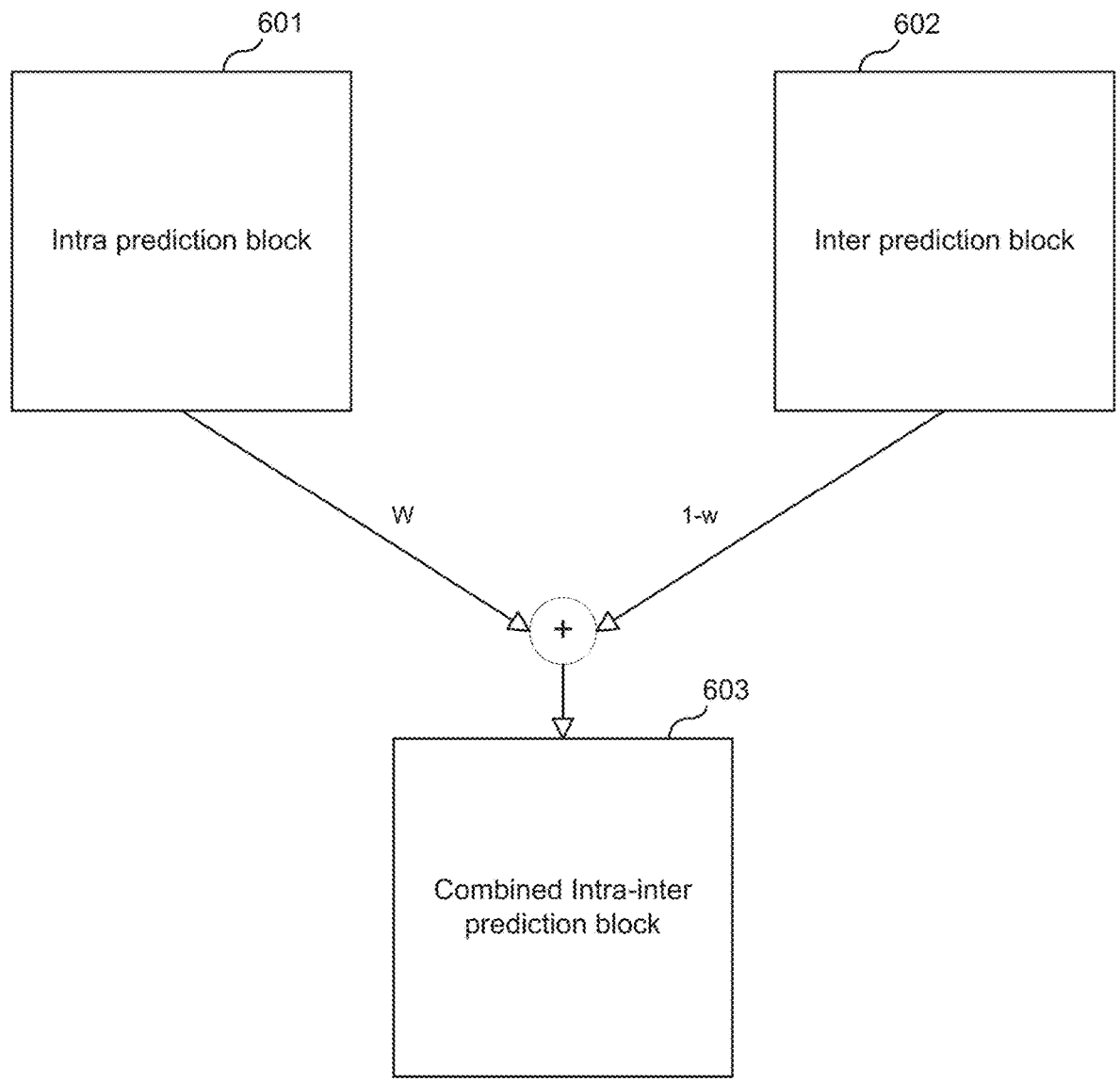
FIG. 6. illustrates a process for producing a combined intra-inter prediction block.

A boundary 502 between block P and block Q (see FIG. 5) is deblocked where at least block P or block Q is a combined intra-inter prediction block 603 (see FIG. 6)—i.e., a block based on a weighted combination of an intra-prediction block 601 and an inter-prediction block 602.

This could be implemented such that the BS (boundary strength) is set to a non-zero value for a boundary between block P and Q when either block P or block Q correspond to a coding mode that is based on a weighted combination of an intra prediction block and an inter prediction block.

Figure 7:
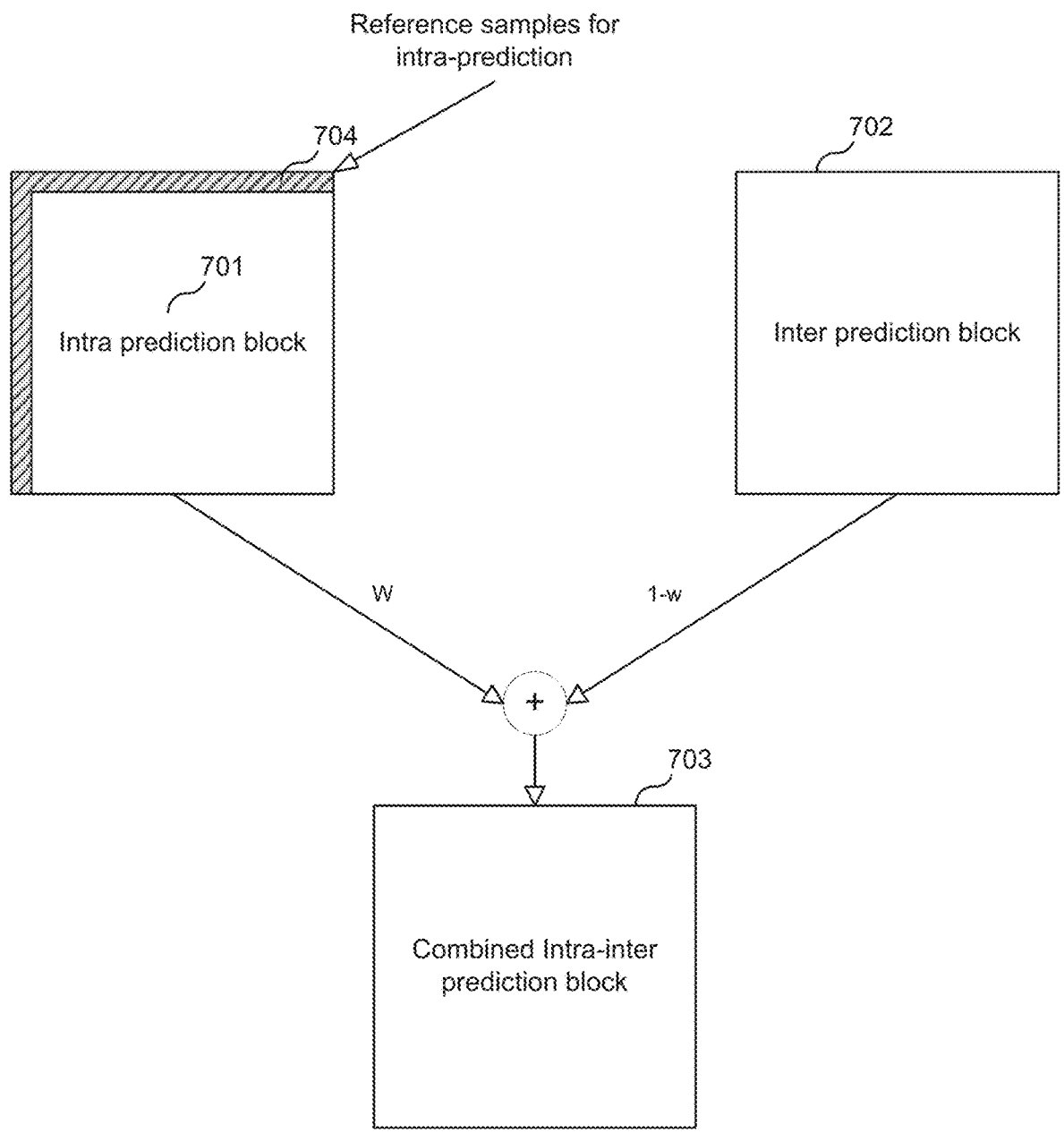
FIG. 7 illustrates a process for producing a combined intra-inter prediction block.

In an alternative embodiment, an intra prediction block 701 (see FIG. 7) is predicted from a line of samples 704 (not intra block copy also referred to as current picture referencing). This alternative embodiment could be implemented such that the BS (boundary strength) is set to a non-zero value for a boundary between block P and Q when either block P or block Q is a combined intra-inter prediction block 703 that is based on a weighted combination of an intra prediction block 701 and an inter prediction 702, where the intra prediction block 701 is based on prediction from a line of samples 704 outside the block 701. In an alternative embodiment the inter prediction 702 can be a block predicted from the current picture, e.g. intra block copy.

Figure 8:
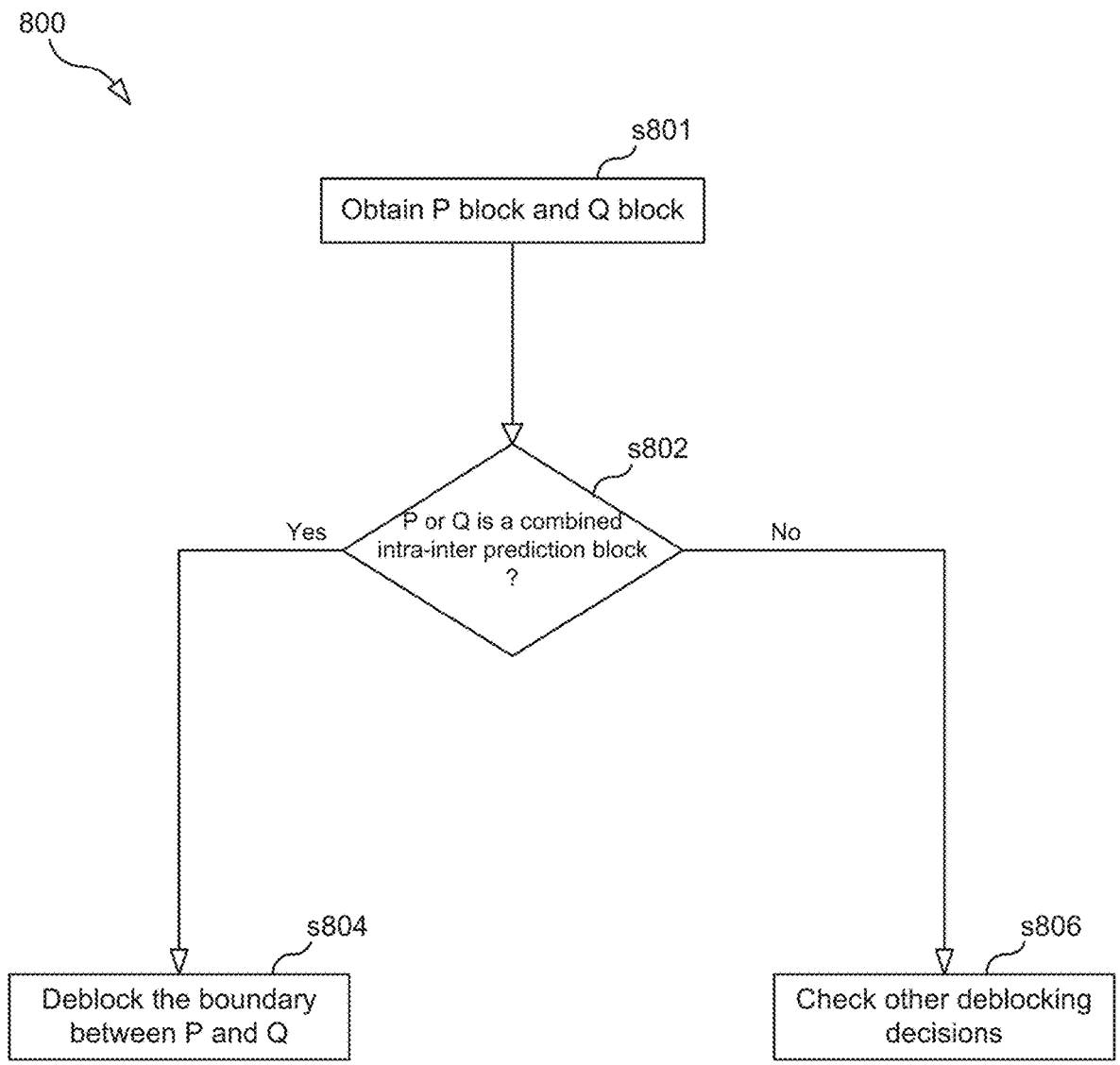
FIG. 8 is a flow chart illustrating a process according to an embodiment.

FIG. 8 is a flow chart illustrating a deblocking process 800, according to an embodiment, for deblocking a boundary between a first block of samples (denoted block "P") and a second block of samples (denoted block "Q"). Process 800 may begin in step s801.

Step s801 comprises obtaining block P and block Q, wherein block Q abuts block P.

Step s802 comprises determining whether a first condition is true, wherein the first condition is true if P or Q is a combined intra-inter prediction block (i.e., P or Q is a block based on a weighted combination of an intra-prediction block and an inter-prediction block). If the first condition is true, then process 800 proceeds to step s804, otherwise the process proceeds to step s806.

Step s804 comprises deblocking the boundary between P and Q. That is, P and Q are filtered by a deblocking filter to reduce discontinuities between P and Q.

Step s806 comprises checking other conditions to determine whether or not the boundary between P and Q should be deblocked. One example is to use the HEVC condition check which performs deblocking when the difference between motion vector between an inter prediction in block P and an inter prediction in block Q is less than a threshold when reference picture is identical or that different reference pictures are used in block P and block Q.

In some embodiments, step s804 (deblocking the boundary between the P block and the Q block) comprises reducing a discontinuity between the P block and the Q block. In some embodiments, reducing the discontinuity between P and Q comprises filtering the P block using a deblocking filter and filtering the Q block using the deblocking filter.

In some embodiments the process also includes setting a boundary strength, bs, variable for the boundary to a value that is greater than zero as a result of determining that at least one of the P block or the Q block is a combined intra-inter prediction block.

In some embodiments the boundary is a vertical boundary or a horizontal boundary.

In some embodiments, the process also includes generating a block of samples based on a weighted combination of an intra-prediction block and an inter-prediction block, wherein one of the P block or the Q block is the generated block of samples. In some embodiments, the process also includes generating the intra-prediction block from a line of samples or generating the intra-prediction block from referencing a block in a current picture. In some embodiments, the process also includes generating the inter-prediction block from referencing at least one block in a previous decoded picture or generating the inter-prediction block from referencing a block in a current picture.

In some embodiments, the process also includes deblocking a boundary between a first sub-block and a second sub-block if a first condition is true, wherein the first condition is true if: the first sub-block is a weighted combination of a first intra prediction sub-block and a first inter prediction sub-block, the second sub-block is a weighted combination of a second intra prediction sub-block and a second inter prediction sub-block, and the weight for the first intra prediction sub-block is different from the weight for the second intra prediction sub-block.

Example 2

Figure 9:
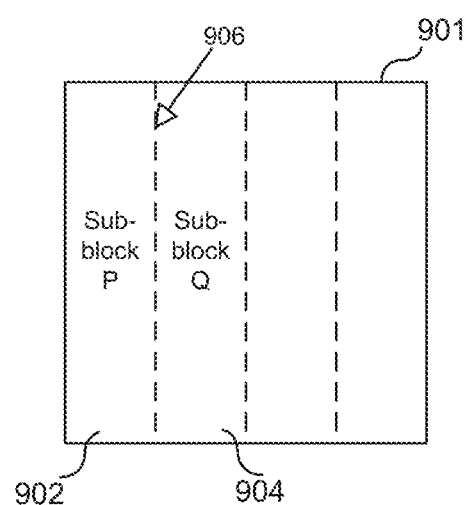
FIG. 9 illustrates a vertical boundary between two sub-blocks of a combined intra-inter prediction block.
Figure 10:
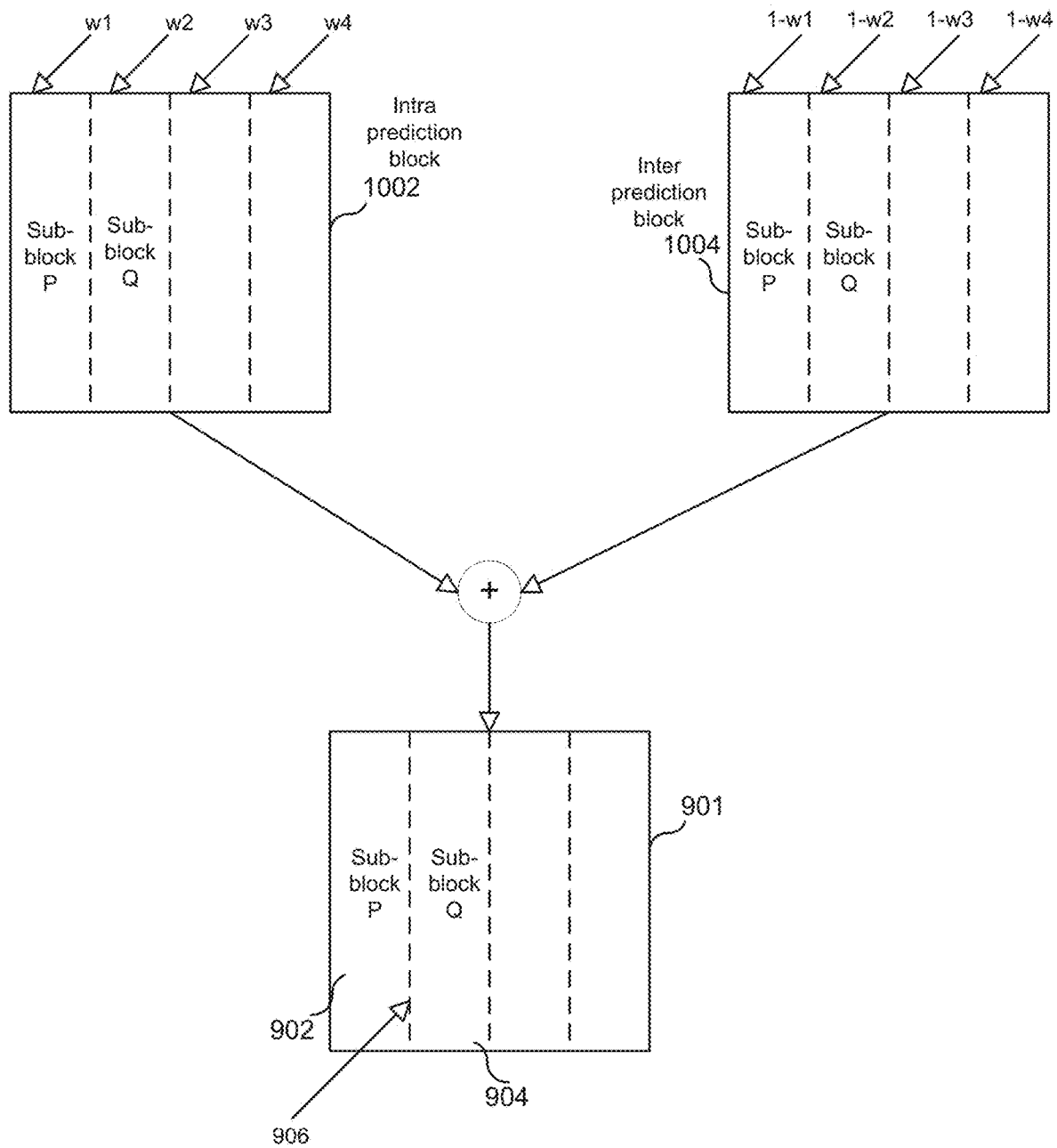
FIG. 10 illustrates a process for producing a combined intra-inter prediction block.

A sub-block boundary (906, see FIG. 9) inside a block 901 is deblocked if the following is true: i) the boundary 906 is the boundary between a first sub-block 902 (denoted sub-block P 902) and a second sub-block 904 (denoted sub-block Q 904), ii) sub-block P 902 is a weighted combination of a) an intra prediction sub-block P 1002 (see FIG. 10) of intra prediction block 1001 and b) an inter prediction sub-block P 1022 of inter prediction block 1021, iii) sub-block Q 904 is a weighted combination of a) an intra prediction sub-block Q 1004 of intra prediction block 1001 and b) an inter prediction sub-block Q 1024 of inter prediction block 1021, and iv) the weight on intra prediction sub-block P 1002 (e.g., w1, see FIG. 10) is different than the weight on the intra prediction sub-block Q 1004 (e.g., w2).

This could be implemented such that the BS (boundary strength) is set to a non-zero value for a boundary between sub-block P and sub-block Q when the weight used for the intra prediction sub-block P is different from the weight used for the intra prediction sub-block Q.

The deblocking strength may be set according to the weight difference between sub-block P and sub-block Q. That is, the deblocking strength may be a function of abs(w1−w2), where w1 is the weight on sub-block P 1002 and w2 is the weight on sub-block Q 1004. One example is to set a lower BS value (e.g., BS=1) when the weight difference is lower than a certain threshold and set a higher BS value (e.g., BS=2) when the weight difference is larger than the threshold.

Figure 11:
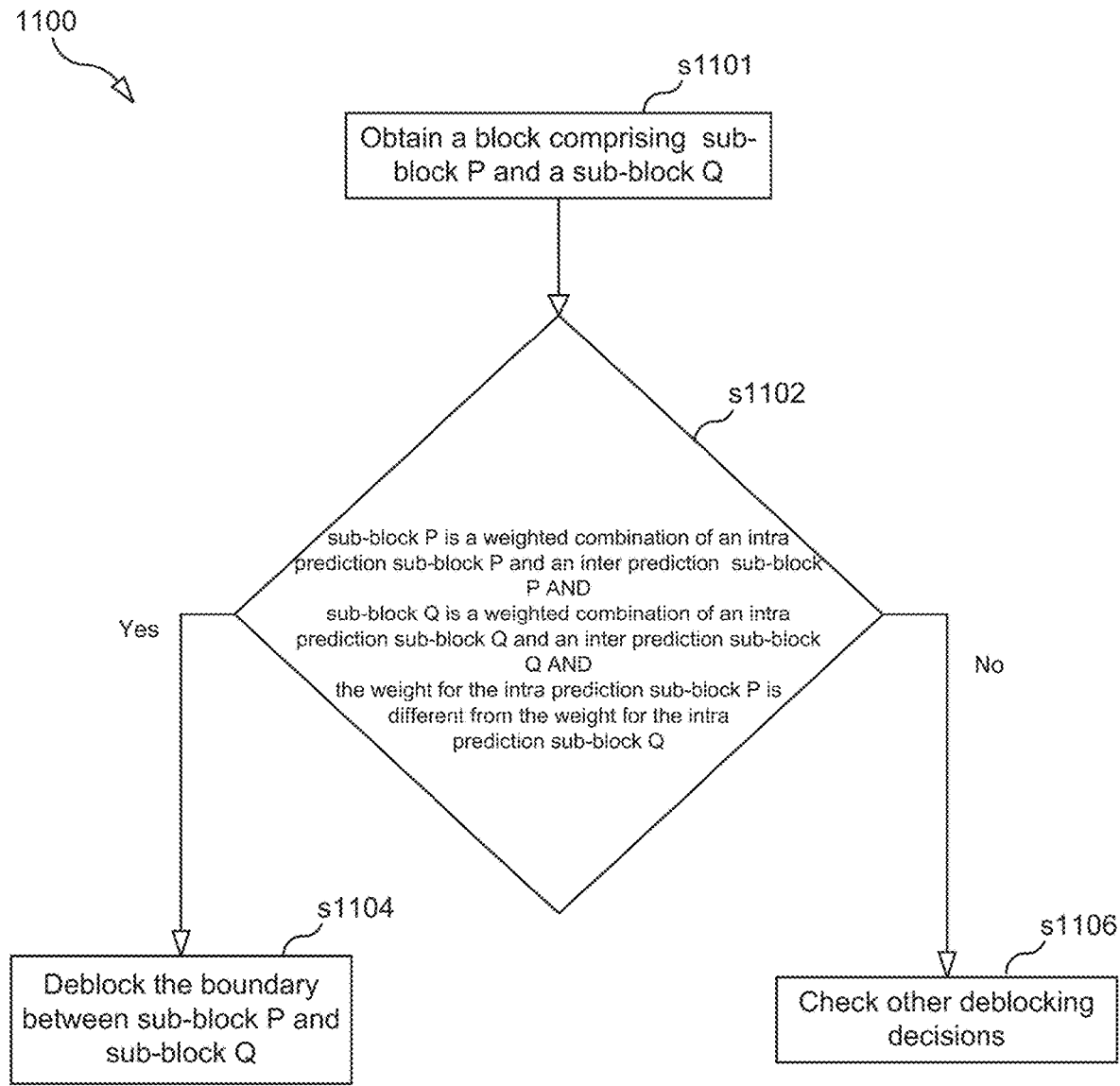
FIG. 11 is a flow chart illustrating a process according to an embodiment.

FIG. 11 is a flow chart illustrating a deblocking process 1100, according to an embodiment, for deblocking boundary between a first sub-block of samples (denoted sub-block "P") within a certain block (e.g., block 901) and a second sub-block of samples (denoted sub-block "Q") within the block, wherein block Q abuts block P. Process 1100 may begin in step s1101.

Step s1101 comprising obtaining the certain block containing the sub-block P and the sub-block Q.

Step s1102 comprises determining whether a first condition is true, wherein the first condition is true if: sub-block P is a weighted combination of an intra prediction sub-block P and an inter prediction sub-block P AND sub-block Q is a weighted combination of an intra prediction sub-block Q and an inter prediction sub-block Q AND the weight for the intra prediction sub-block P is different from the weight for the intra prediction sub-block Q.

If the first condition is true, then process 1100 proceeds to step s1104, otherwise the process proceeds to step s1106.

Step s1104 comprises deblocking the boundary between sub-blocks P and Q. That is, sub-blocks P and Q are filtered by a deblocking filter to reduce discontinuities between sub-blocks P and Q.

Step s1106 comprises checking other conditions to determine whether or not the boundary between sub-blocks P and Q should be deblocked. One example is to use the HEVC condition check described above.

Figure 12:
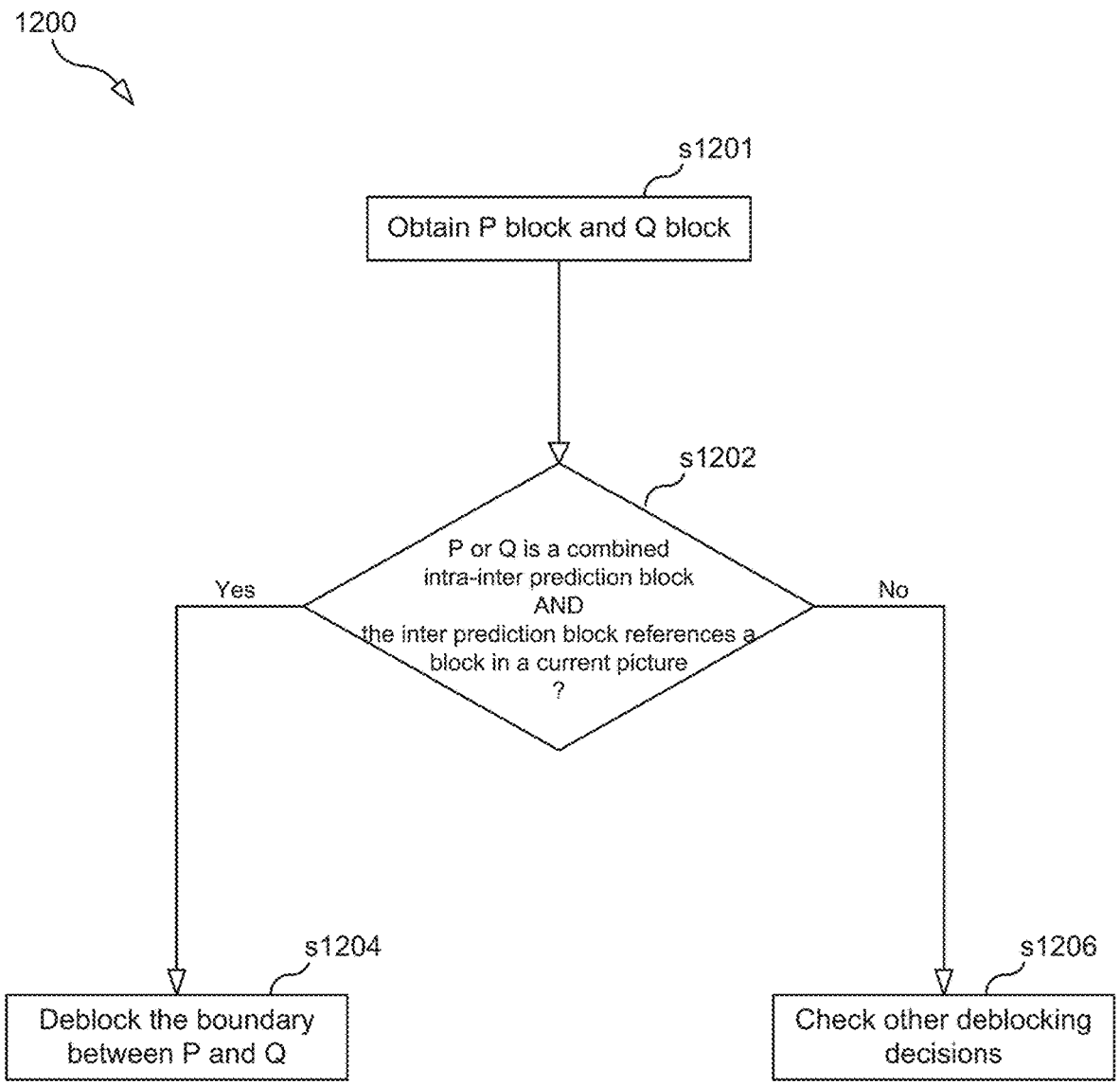
FIG. 12 is a flow chart illustrating a process according to an embodiment.

FIG. 12 is a flow chart illustrating a deblocking process 1200, according to an embodiment, for deblocking a boundary between a first block of samples (denoted block "P") and a second block of samples (denoted block "Q"). Process 1200 may begin in step s1201.

Step s1201 comprises obtaining block P and block Q, wherein block Q abuts block P.

Step s1202 comprises determining whether a first condition is true, wherein the first condition is true if: P or Q is formed by combining an intra prediction block (e.g., 601, 701) and an inter prediction block (e.g., 602, 702) (i.e., P or Q is a combined intra-inter prediction block) and the inter prediction block (602, 702) references a block in a current picture. That is, the inter prediction block (602, 702) is predicted from reconstructed samples of the current picture. If the first condition is true, then process 1200 proceeds to step s1204, otherwise the process proceeds to step s1206.

Step s1204 comprises deblocking the boundary between P and Q. That is, P and Q are filtered by a deblocking filter to reduce discontinuities between P and Q.

Step s1206 comprises checking other conditions to determine whether or not the boundary between P and Q should be deblocked. One example is to use the HEVC condition check which performs deblocking when the difference between motion vector between an inter prediction in block P and an inter prediction in block Q is less than a threshold when reference picture is identical or that different reference pictures are used in block P and block Q.

Figure 13:
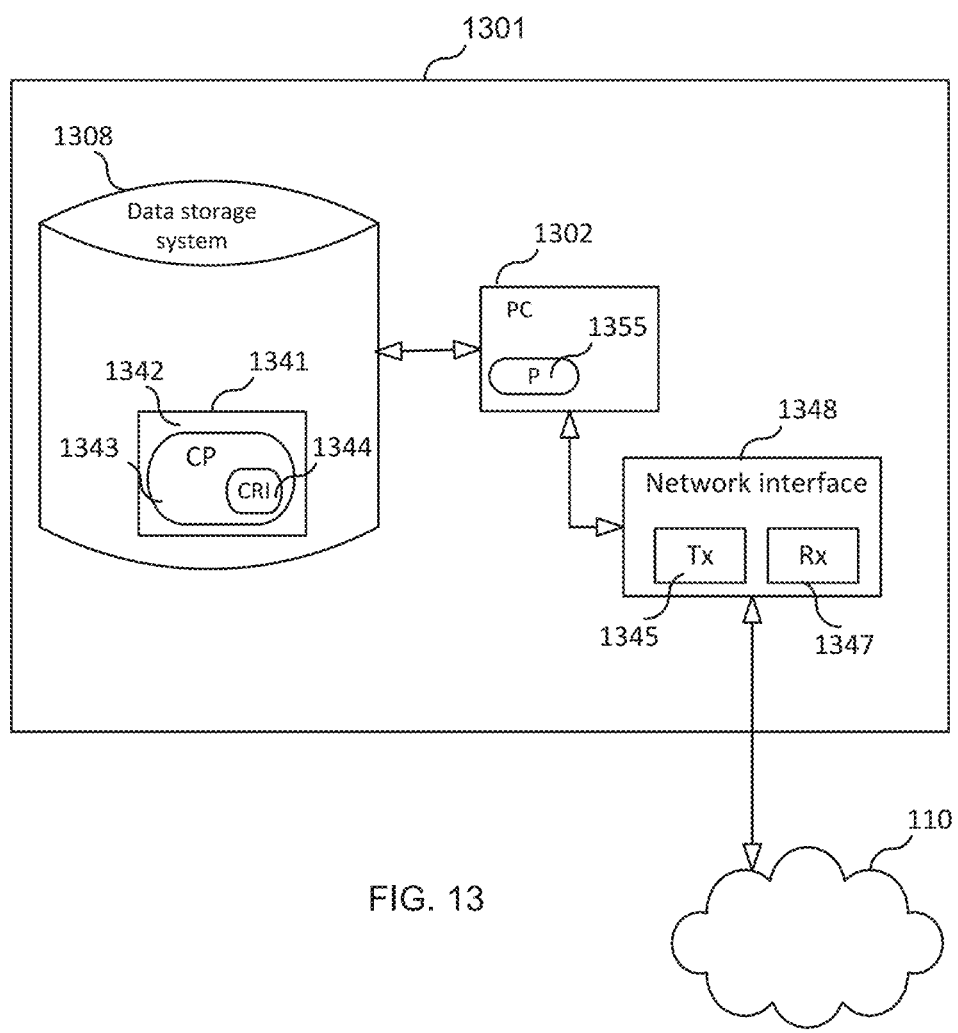
FIG. 13 is a block diagram of an apparatus according to one embodiment.

FIG. 13 is a block diagram of an apparatus 1301 for implementing encoder 202 or decoder 204, according to some embodiments. As shown in FIG. 13, apparatus 1301 may comprise: processing circuitry (PC) 1302, which may include one or more processors (P) 1355 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed; a network interface 1348 comprising a transmitter (Tx) 1345 and a receiver (Rx) 1347 for enabling apparatus 1301 to transmit data to and receive data from other nodes connected to network 130 (e.g., an Internet Protocol (IP) network) to which network interface 1348 is connected; and a local storage unit (a.k.a., "data storage system") 1308, which may include one or more non-volatile storage devices and/or one or more volatile storage devices. In embodiments where PC 1302 includes a programmable processor, a computer program product (CPP) 1341 may be provided. CPP 1341 includes a computer readable medium (CRM) 1342 storing a computer program (CP) 1343 comprising computer readable instructions (CRI) 1344. CRM 1342 may be a non-transitory computer readable medium, such as, magnetic media (e.g., a hard disk), optical media, memory devices (e.g., random access memory, flash memory), and the like. In some embodiments, the CRI 1344 of computer program 1343 is configured such that when executed by PC 1302, the CRI causes apparatus 1301 to perform steps described herein (e.g., steps described herein with reference to the flow charts). In other embodiments, apparatus 1301 may be configured to perform steps described herein without the need for code. That is, for example, PC 1302 may consist merely of one or more ASICs. Hence, the features of the embodiments described herein may be implemented in hardware and/or software.

SUMMARY OF VARIOUS EMBODIMENTS DESCRIBED ABOVE

A1. A deblocking method (800), the method comprising: deblocking (804) a boundary between a first block (P) and a second block (Q) if a first condition is true, wherein the first condition is true if P or Q is a combined intra-inter prediction block.

B1. A deblocking method (1100), the method comprising: deblocking a boundary between a first sub-block (P) and a second sub-block (Q) if a first condition is true, wherein the first condition is true if: sub-block P is a weighted combination of an intra prediction sub-block P and an inter prediction sub-block P; sub-block Q is a weighted combination of an intra prediction sub-block Q and an inter prediction sub-block Q; and the weight for the intra prediction sub-block P is different from the weight for the intra prediction sub-block Q.

C1. A deblocking method (1200), the method comprising: deblocking (1204) a boundary between a first block (P) and a second block (Q) if a first condition is true, wherein the first condition is true if P or Q is formed by combining an intra prediction block (601, 701) and an inter prediction block (602, 702) (i.e., P or Q is a combined intra-inter prediction block) and wherein said inter prediction block (602, 702) references a block in a current picture.

While various embodiments are described herein, it should be understood that they have been presented by way of example only, and not limitation. For example, the exact weights used do not impact on the usability of the embodiments and could in general terms be seen as examples of weights for combining an inter and inter prediction. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

REFERENCES

[1] JVET-L1001, "Versatile Video Coding (Draft 3)," October 2018, available at phenix.it-sudparis.eu/jvet/doc_end_user/documents/12_Macao/wg11/JVET-L1001-v13.zip.

The invention claimed is:

1. A method for deblocking a boundary between a first block of samples, block P, and a second block of samples, block Q, the method comprising:
   determining whether at least one of the P block or the Q block is a combined intra-inter prediction block; and
   as a result of determining that at least one of the P block or the Q block is a combined intra-inter prediction block, deblocking the boundary between the P block and the Q block.

2. The method of claim 1, wherein deblocking the boundary between the P block and the Q block comprises reducing a discontinuity between the P block and the Q block.

3. The method of claim 2, wherein reducing the discontinuity between P and Q comprises filtering the P block using a deblocking filter and filtering the Q block using the deblocking filter.

4. The method of claim 1, further comprising setting a boundary strength (BS) variable for the boundary to a value that is greater than zero as a result of determining that at least one of the P block or the Q block is a combined intra-inter prediction block.

5. The method of claim 1, wherein the boundary is a vertical boundary.

6. The method of claim 1, wherein the boundary is a horizontal boundary.

7. The method of claim 1, further comprising generating a block of samples based on a weighted combination of an intra-prediction block and an inter-prediction block, wherein one of the P block or the Q block is the generated block of samples.

8. The method of claim 7, further comprising generating the intra-prediction block from a line of samples.

9. The method of claim 7, further comprising generating the intra-prediction block from referencing a block in a current picture.

10. The method of claim 7, further comprising generating the inter-prediction block from referencing at least one block in a previous decoded picture.

11. The method of claim 7, further comprising generating the inter-prediction block from referencing a block in a current picture.

12. The method of claim 1, further comprising:
deblocking a boundary between a first sub-block and a second sub-block if a first condition is true, wherein the first condition is true if:
the first sub-block is a weighted combination of a first intra prediction sub-block and a first inter prediction sub-block,
the second sub-block is a weighted combination of a second intra prediction sub-block and a second inter prediction sub-block, and
the weight for the first intra prediction sub-block is different from the weight for the second intra prediction sub-block.

13. A computer program product comprising a non-transitory computer readable medium storing a computer program comprising instructions which when executed by processing circuitry causes the processing circuitry to perform the method of claim 1.

14. An apparatus, the apparatus comprising:
processing circuitry; and
a memory, said memory containing instructions executable by said processing circuitry, whereby said apparatus is adapted to:
determine whether at least one of the P block or the Q block is a combined intra-inter prediction block; and
as a result of determining that at least one of the P block or the Q block is a combined intra-inter prediction block, deblock the boundary between the P block and the Q block.

15. The apparatus of claim 14, wherein the apparatus is further adapted to set a boundary strength (BS) variable for the boundary to a value that is greater than zero as a result of determining that at least one of the P block or the Q block is a combined intra-inter prediction block.

16. The apparatus of claim 14, wherein the apparatus is further adapted to generate a block of samples based on a weighted combination of an intra-prediction block and an inter-prediction block, wherein one of the P block or the Q block is the generated block of samples.

* * * * *

UNITED STATES PATENT AND TRADEMARK OFFICE
CERTIFICATE OF CORRECTION

| | | |
|---|---|---|
| PATENT NO. | : 11,240,497 B2 | |
| APPLICATION NO. | : 16/630233 | |
| DATED | : February 1, 2022 | |
| INVENTOR(S) | : Andersson et al. | |

It is certified that error appears in the above-identified patent and that said Letters Patent is hereby corrected as shown below:

In the Specification

In Column 2, Line 4, delete "form" and insert -- from --, therefor.

In Column 6, Line 26, delete "form" and insert -- from --, therefor.

In Column 6, Line 29, delete "form" and insert -- from --, therefor.

Signed and Sealed this
Twenty-third Day of August, 2022

Katherine Kelly Vidal
*Director of the United States Patent and Trademark Office*